(12) United States Patent  
Fairhurst

(10) Patent No.: US 8,899,799 B1
(45) Date of Patent: Dec. 2, 2014

(54) STROLLER SAFETY LIGHT ASSEMBLY

(71) Applicant: Brian G. Fairhurst, Galt, CA (US)

(72) Inventor: Brian G. Fairhurst, Galt, CA (US)

( * ) Notice: Subject to any disclaimer, the term of this patent is extended or adjusted under 35 U.S.C. 154(b) by 28 days.

(21) Appl. No.: 13/762,553

(22) Filed: Feb. 8, 2013

(51) Int. Cl.
*B60Q 1/00* (2006.01)
*B60Q 3/00* (2006.01)
*B60Q 1/26* (2006.01)
*B62B 9/00* (2006.01)

(52) U.S. Cl.
CPC .............. *B60Q 1/2615* (2013.01); *B62B 9/005* (2013.01)
USPC ............................ 362/459; 362/540; 362/545

(58) Field of Classification Search
CPC ............ B62D 39/00; B62D 7/00; B62D 1/00; F21V 21/00; F21V 21/88; F21V 21/096
USPC ......................................................... 362/486
See application file for complete search history.

(56) References Cited

U.S. PATENT DOCUMENTS

| | | | |
|---|---|---|---|
| 5,683,164 A | 11/1997 | Chien | |
| 6,394,633 B1* | 5/2002 | Perez | 362/459 |
| 6,568,838 B2* | 5/2003 | Taylor et al. | 362/474 |
| 7,059,738 B1 | 6/2006 | Nobayashi | |
| 7,259,691 B2 | 8/2007 | Kimbrough, Jr. | |
| 8,356,824 B1* | 1/2013 | Manweiler et al. | 280/33.992 |
| 2009/0244916 A1* | 10/2009 | Conwell et al. | 362/464 |
| 2012/0155097 A1* | 6/2012 | Gross | 362/459 |
| 2012/0300439 A1* | 11/2012 | Davis Hatfield et al. | 362/183 |

* cited by examiner

*Primary Examiner* — Jason Moon Han
(74) *Attorney, Agent, or Firm* — Crossley Patent Law

(57) ABSTRACT

A stroller safety light assembly fittable and releasably securable to a frame of an extant stroller wherein a plurality of LEDs illuminate the frame of the stroller and a pair of headlights, disposed proximal the stroller front wheels, directs illumination forwards and a pair of taillights, disposed proximal to the stroller rear wheels, directs illumination rearwards whereby said stroller is made more visible to road users and passersby.

12 Claims, 3 Drawing Sheets

STROLLER SAFETY LIGHT ASSEMBLY

BACKGROUND OF THE INVENTION

Various types of stroller safety features are known in the prior art. However, what is needed is a stroller safety light assembly fittable and releasably securable to a frame of an extant stroller wherein a plurality of LEDs illuminate the frame of the stroller and a pair of headlights, disposed proximal the stroller front wheels, directs illumination forwards and a pair of taillights, disposed proximal to the stroller rear wheels, directs illumination rearwards whereby the stroller is made more visible to road users and passersby.

FIELD OF THE INVENTION

The present invention relates to a stroller safety light assembly, and more particularly, to a stroller safety light assembly fittable and releasably securable to a frame of an extant stroller wherein a plurality of LEDs illuminate the frame of the stroller and a pair of headlights, disposed proximal the stroller front wheels, directs illumination forwards and a pair of taillights, disposed proximal to the stroller rear wheels, directs illumination rearwards whereby the stroller is made more visible to road users and passersby.

SUMMARY OF THE INVENTION

The general purpose of the stroller safety light assembly, described subsequently in greater detail, is to provide a stroller safety light assembly which has many novel features that result in a stroller safety light assembly which is not anticipated, rendered obvious, suggested, or even implied by prior art, either alone or in combination thereof.

Pedestrian traffic is too often neglected by road users, and tragedy is too often the outcome of inattention, distraction, or diversion. In the modern world, with increasing populations traveling in increasingly active urban centers, surrounded by the nimiety of lights and advertisements, other vehicles, pedestrians, cyclists, and electronic multimedia that mark the era, pedestrians are all too easily overlooked, neglected, unnoticed, or unseen. Despite the abundance of traffic controls typical of the modern city—which oftentimes add to the nimiety of lights, noises, and distractions—pedestrians are all too often the victims of a driver's inattention or distraction. This tragedy is only exacerbated when a small child or infant is involved.

What is needed, therefore, is a stroller safety light assembly fittable and releasably securable to a frame of an extant stroller wherein a plurality of LEDs illuminate the frame of the stroller and a pair of headlights, disposed proximal the stroller front wheels, directs illumination forwards and a pair of taillights, disposed proximal to the stroller rear wheels, direct illumination rearwards whereby the stroller is made more visible to passersby.

The present invention, then, has been devised to fit to the frame of an extant stroller. The present invention includes a series of first LEDs disposed upon a first cord and a series of second LEDs disposed upon a second cord. A battery box is disposed in circuit between the first cord and the second cord, wherein at least one cell is storable in a weatherproof situation to provide power to the device, as needed. Each of said first and second LEDs is disposed upon an LED housing, which LED housing is releasably securable to the frame of the extant stroller by means of a hook and loop fastener disposed thereupon. The battery box is likewise releasably securable to the frame by means of a hook and loop fastener.

Each of a pair of headlights is disposed endwise on each of the first and second cords, each of said headlights pivotally attached to a respective clamp member releasably securable to the frame of the stroller. The pair of headlights are therefore attachable to the frame of the stroller and directable thereat by means of the clamp members, whereby the illumination emanated from each of the pair of headlights may be shone in a specific direction, as desired, forwardly from the stroller to which the device is attached.

Each of a pair of taillights is disposed on each of the first and second cord, each of the pair of taillights proximal the battery box. Each of the pair of taillights is likewise pivotally attached to a respective clamp member that is releasably securable to the frame of the stroller, as desired. Each of the pair of taillights is disposed to releasably secure to the frame of the stroller proximal to the stroller rear wheels, each of the pair of taillights disposed in a rearward situation whereby light emanated from each of said taillights is directable to be shone rearwardly, as desired.

In the preferred embodiment herein disclosed, the series of first LEDs includes six LEDs serried at regular intervals upon the first cord. The series of second LEDs includes six LEDs serried at regular intervals upon the second cord. Each of the pair of taillights is disposed upon each of the respective first and second cord at a position between two of the LEDs disposed thereupon. When the battery box is releasably secured to the frame of the stroller at a center of a rearward crossbar of said frame, each of the first cord and the second cord are disposed to overlie the respective left and right side frame of the stroller, wherein each of the pair of taillights is disposed proximal to a respective rear wheel of the stroller, and situated to shine rearwards therefrom, and each of the pair of headlights is disposed proximal to a respective front wheel of the stroller, and situated to shine forwards therefrom. Thusly, the frame of the stroller is illuminated when an on/off switch disposed upon the battery box is turned to the on position, and the stroller is made more visible to road users and passersby.

It should be noted that additional sequencing of the LEDs is considered within the metes and bounds of the invention herein disclosed. The LEDs may be different colors (for example, red on the left side of the stroller, and green on the right side of the stroller, or a sequence of colors), may flash on and off at controllable intervals, fade between colors, or otherwise illuminate and alternately deactivate to more visibly illuminate the frame of the stroller to which the device is attached. The taillights may be an alternate color than the headlights, for example, each of the pair of taillights may be configured to shine a red light and each of the pair of headlights may be configured to shine a white light.

Thus has been broadly outlined the more important features of the present stroller safety light assembly so that the detailed description thereof that follows may be better understood and in order that the present contribution to the art may be better appreciated.

Objects of the present stroller safety light assembly, along with various novel features that characterize the invention are particularly pointed out in the claims forming a part of this disclosure. For better understanding of the stroller safety light assembly, its operating advantages and specific objects attained by its uses, refer to the accompanying drawings and description.

BRIEF DESCRIPTION OF THE DRAWINGS

Figures

DETAILED DESCRIPTION OF THE DRAWINGS

Figure 1:
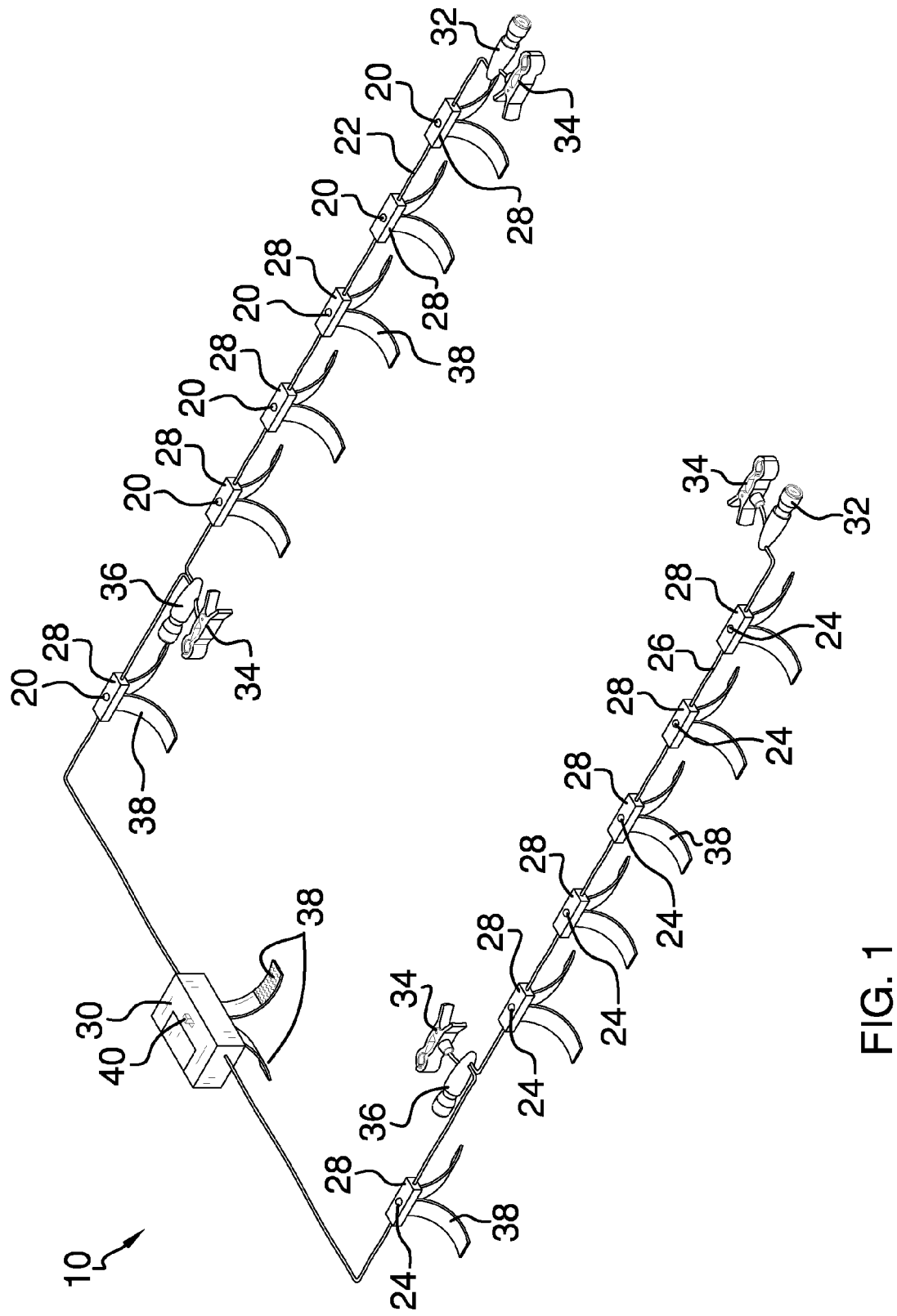
FIG. 1 is an isometric view.
Figure 2:
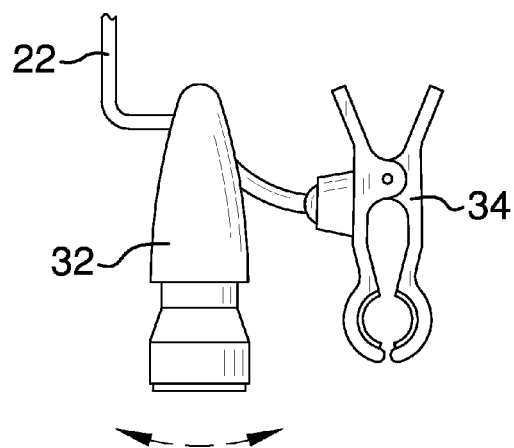
FIG. 2 is a detail view a headlight.
Figure 3:
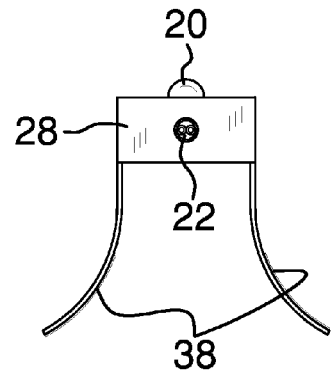
FIG. 3 is a front view of an LED with LED housing.
Figure 4:
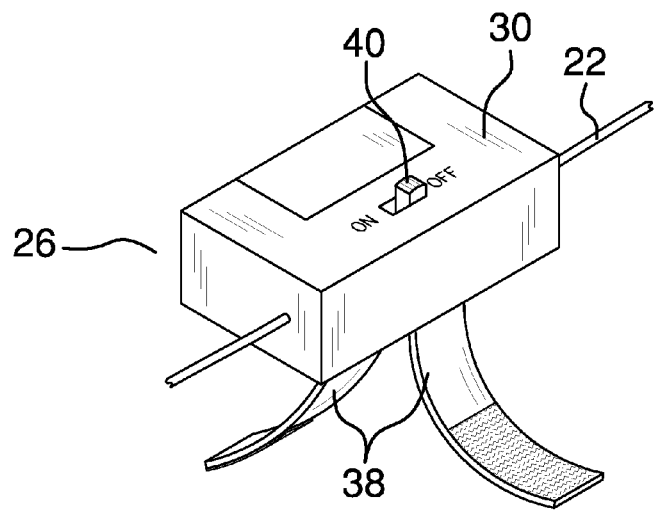
FIG. 4 is an isometric view of a battery box.

With reference now to the drawings, and in particular FIGS. 1 through 5 thereof, example of the instant stroller safety light assembly employing the principles and concepts of the present stroller safety light assembly and generally designated by the reference number 10 will be described.

Referring to FIGS. 1 through 5 a preferred embodiment of the present stroller safety light assembly 10 is illustrated.

The stroller safety light assembly 10 has been devised to releasably secure to a frame 72 of an extant stroller 70 and visually demark the stroller 70 thereby. Traffic in urban areas can be chaotic and distracting. Pedestrians are often overlooked or unseen by traffic merging onto a thoroughfare, reversing out of a driveway, changing lanes, making a right or left turn, or other operation of a motor vehicle, bicycle, or other vehicle, in urban areas. The present device 10, therefore, has been devised to increase the visibility of an extant stroller 70 to which the present device 10 is attached, to lessen the chances of a road user hitting said stroller 70 and causing a catastrophic accident thereby.

The instant stroller safety light assembly 10 includes a series of first LEDs 20 disposed along a first cord 22, and a series of second LEDs 24 disposed along a second cord 26. Each of said series of first and second LEDs 20, 24 is mounted upon a respective LED housing 28. A battery box 30 is disposed in circuit with each of the first cord 22 and the second cord 26, said battery box 30 disposed between the first cord 22 and the second cord 26. The battery box 30 is configured to house at least one power cell (not shown) in a weatherproof situation to power the device 10 as needed.

Each of a pair of headlights 32 is disposed endwise on each of the respective first cord 22 and the second cord 26. Each of said headlights 32 is releasably securable to the frame 72 of the extant stroller 70 by means of a respective clamp member 34. Each of the pair of headlights 32 is pivotally attached to each respective clamp member 34, and each of the pair of headlights 32 is directable thereupon when releasably secured to the frame 72 of the stroller 70. Thusly, each of the pair of headlights 32 is mountable to the frame 72 of the stroller 70 in a forward situation and directable to emanate light forwards.

Each of a pair of taillights 36 is disposed on each of the respective first and second cord 22, 26 proximal to the battery box 30. Each of said taillights 36 is releasably securable to the frame 72 of the extant stroller 70 by means of a respective clamp member 34. Each of the pair of taillights 36 is also pivotally attached to each respective clamp member 34, and each of the pair of taillights 36 is directable thereupon when releasably secured to the frame 72 of the stroller 70. Thusly each of the pair of taillights 36 is mountable to the frame 72 of the stroller 70 in a rearward situation and directable to emanate light rearwards.

To releasably secure each of the first and second LEDs 20, 24 to the frame 72 of the stroller 70, a hook and loop fastener 38 is disposed upon each of the LED housings 28 and the battery box 30, each hook and loop fastener 38 releasably securable to the frame 72 of the extant stroller 70 whereby each LED 20, 24 and the battery box 30 is releasably securable to the frame 72 of the extant stroller 70.

Each of the first and second LEDs 20, 24 is therefore releasably attachable to the frame 72 of the extant stroller 70, each of the pair of headlights 32 is releasably attachable to the frame 72 of said stroller 70 in a forward situation to emanate light forwards, and each of the pair of taillights 36 is releasably attachable to the frame 72 of said extant stroller 70 in a rearward situation to emanate light rearwards, and the stroller 70 is visually demarked by each of the series of first and second LEDs 20, 24.

Figure 5:
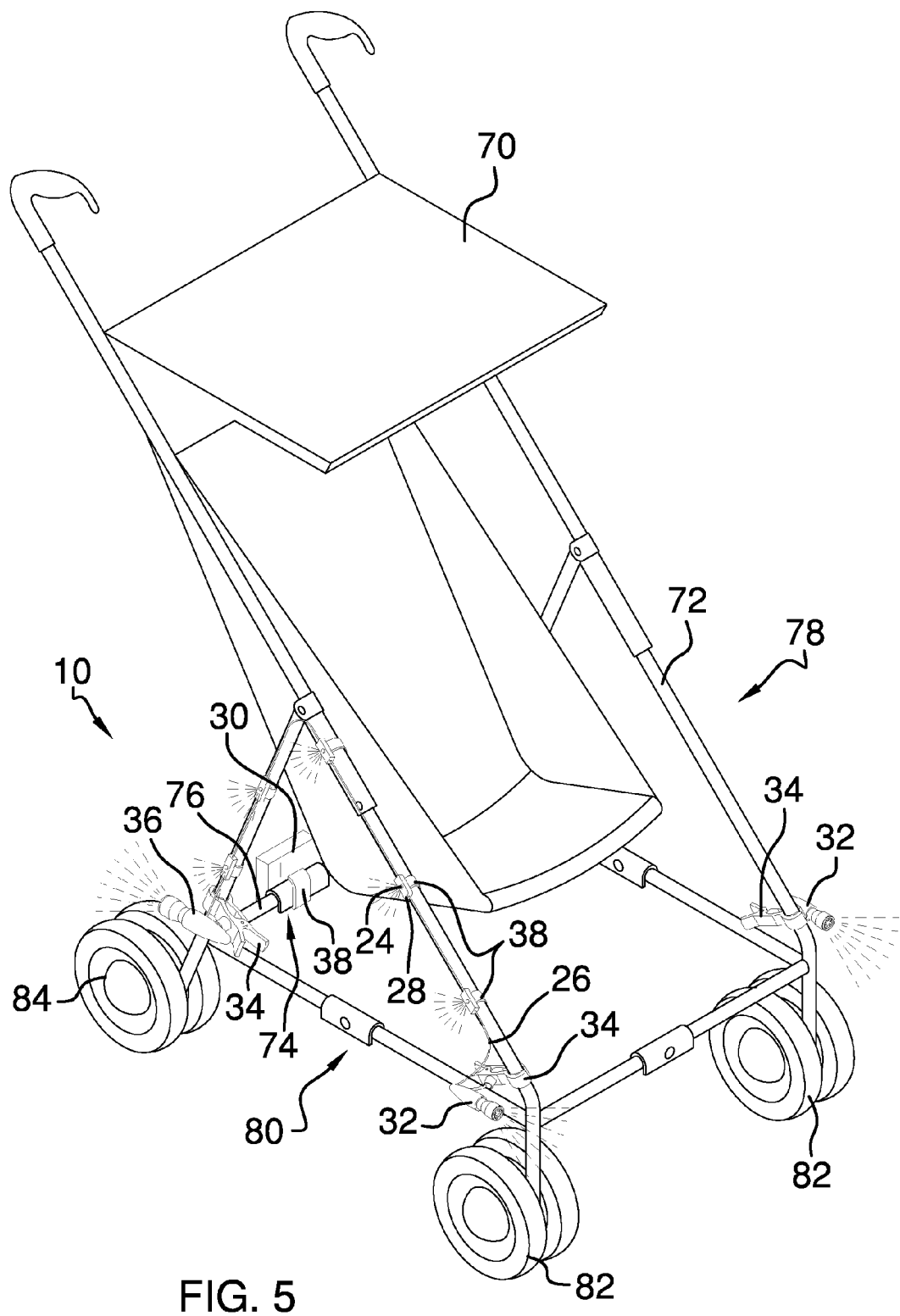
FIG. 5 is an in-use view with the apparatus installed upon a frame of an extant stroller.

In the preferred embodiment illustrated in FIG. 5, the battery box 30 is attachable to a center 74 of a rearward crossbar 76 of the frame 72 of the stroller 70. The first cord 22 is then overlain a left side frame 78 of the stroller 70 and the second cord 26 is overlain the right side frame 80 of the stroller 70. The series of first LEDs 20 includes six LEDs serried at regular intervals along the first cord 22. The series of second LEDs 24 includes six LEDs serried at regular intervals along the second cord 24. Each of the pair of headlights 32, disposed endwise on each respective first cord 20 and second cord 24, is therefore situated proximal to a respective front wheel 82 of the stroller. Each of the pair of taillights 36, disposed proximal to the battery box 30, is therefore situated proximal to each respective rear wheel 84 and oriented to shine rearwards when activated.

It is considered as part of the metes and bounds of the invention that each of the first and second LEDs 20, 24 may flash, illuminate in sequence, change color, be configured to shine different colors, illuminate at various controllable frequencies, or otherwise illuminate and deactivate to engender increased visibility of the stroller 70 to which the device 10 is attached. The pair of headlights 32 are intended to shine a white or yellow light and the pair of taillights 36 a red or orange light, but the device 10 should not be considered limited by the particular color of the headlights 32, taillights 36, or said LEDs 20, 24, nor the frequency of illumination or the configuration of illumination of each of said LEDs 20, 24.

To activate the device 10, an on/off switch 40 is included disposed on the battery box 30. Additional settings may be included to alter the frequency of the illumination and to include settings controlling the activation and deactivation of said LEDs 20, 24, as mentioned previously, in a sequence or coloration, as desired.

What is claimed is:
1. A stroller safety light assembly comprising:
a series of first LEDs disposed along a first cord;
a series of second LEDs disposed along a second cord;
a battery box disposed in circuit with each of the first cord and the second cord, said battery box disposed between the first cord and the second cord;
a pair of headlights, each of said pair of headlights disposed endwise on each of the respective first cord and the second cord;
a pair of taillights, each of said pair of taillights disposed on each of the respective first and second cord generally proximal to the battery box;
wherein each of the series of first and second LEDs is releasably attachable to a frame of an extant stroller, each of the pair of headlights is releasably attachable to the frame of said stroller in a forward situation to emanate light forwards, and each of the pair of taillights is releasably attachable to the frame of said stroller in a rearward situation to emanate light rearwards, whereby said stroller is visually demarked by each of the series of first and second LEDs, the headlights illuminate forwards, and the taillights illuminate rearwards, whereby said stroller is made more visible thereby.
2. The stroller safety light assembly of claim 1 wherein the series of first LEDs comprises six LEDs serried in circuit upon the first cord at regular intervals and the series of second

LEDs comprises six LEDs serried in circuit upon the second cord at regular intervals wherein the frame of an extant stroller is illuminable thereby.

3. The stroller safety light assembly of claim 2 wherein each of the pair of headlights releasably clamps to the frame of an extant stroller proximal the front wheels of the stroller.

4. The stroller safety light assembly of claim 3 wherein each of the pair of taillights releasably clamps to the frame of an extant stroller proximal to the rear wheels of the stroller.

5. The stroller safety light assembly of claim 4 wherein each of the pair of headlights and each of the pair of taillights releasably clamps to the frame of the extant stroller by means of a clamp member.

6. The stroller safety light assembly of claim 5 wherein each of the pair of headlights and each of the pair of taillights is pivotally attached to each respective clamp member whereby each of said headlights and taillights is directable when releasably secured to the frame of the extant stroller.

7. The stroller safety light assembly of claim 6 wherein each of the LEDs is disposed in a LED housing.

8. The stroller safety light assembly of claim 7 wherein each of the LEDs is releasably attachable to the frame of the extant stroller by means of a hook and loop fastener disposed upon each of the LED housings.

9. The stroller safety light assembly of claim 8 wherein the battery box comprises a hook and loop fastener to releasably secure the battery box to the frame of the extant stroller.

10. The stroller safety light assembly of claim 9 wherein the battery box is attachable to a rearward crossbar of the frame of the extant stroller, and each of the series of first and second LEDs is disposed to overlie the frame of the stroller on either side of the stroller.

11. A stroller safety light assembly comprising:
   a series of first LEDs disposed along a first cord, each of said first LEDs mounted in a LED housing;
   a series of second LEDs disposed along a second cord, each of said second LEDs mounted in an LED housing;
   a battery box disposed in circuit with each of the first cord and the second cord, said battery box disposed between the first cord and the second cord;
   a pair of headlights, each of said pair of headlights disposed endwise on each of the respective first cord and the second cord, each of said headlights releasably securable to the frame of an extant stroller by means of a clamp member;
   a pair of taillights, each of said pair of taillights disposed on each of the respective first and second cord generally proximal to the battery box, each of said taillights releasably securable to the frame of an extant stroller by means of a clamp member;
   a hook and loop fastener disposed upon each of the LED housings and the battery box, each hook and loop fastener releasably securable to the frame of the extant stroller;
   wherein each of the first and second LEDs is releasably attachable to the frame of an extant stroller, each of the pair of headlights is releasably attachable to the frame of said stroller in a forward situation to emanate light forwards, and each of the pair of taillights is releasably attachable to the frame of said stroller in a rearward situation to emanate light rearwards, whereby said stroller is visually demarked by each of the series of first and second LEDs, the headlights illuminate forwards, and the taillights illuminate rearwards, whereby said extant stroller is made more visible thereby.

12. The stroller safety light assembly of claim 11 wherein each of the pair of headlights and each of the pair of taillights is pivotally attached to each respective clamp member whereby said headlights and said taillights are directable when releasably secured to the frame of the extant stroller.

\* \* \* \* \*